US009705936B2

(12) United States Patent
Jaynes (10) Patent No.: US 9,705,936 B2
(45) Date of Patent: Jul. 11, 2017

(54) SYSTEM AND METHOD FOR INTERACTIVE AND REAL-TIME VISUALIZATION OF DISTRIBUTED MEDIA (71) Applicant: Mersive Technologies, Inc., Denver, CO (US)

(72) Inventor: Christopher O. Jaynes, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 0 days.

(21) Appl. No.: 14/695,796

(22) Filed: Apr. 24, 2015

(65) Prior Publication Data

US 2016/0316172 A1    Oct. 27, 2016

(51) Int. Cl.
H04N 7/14    (2006.01)
H04L 29/06    (2006.01)
G06T 3/40    (2006.01)
G06Q 10/10    (2012.01)
H04M 3/56    (2006.01)

(52) U.S. Cl.
CPC ....... H04L 65/1069 (2013.01); G06Q 10/101 (2013.01); G06T 3/4092 (2013.01); H04L 65/4092 (2013.01); H04M 3/567 (2013.01); H04N 7/147 (2013.01)

(58) Field of Classification Search
CPC ... H04L 65/1069; H04L 65/4092; G06T 3/40; G06T 3/4092; G06Q 10/101; H04M 3/567
USPC ........................................... 348/14.01–14.16
See application file for complete search history.

(56) References Cited

U.S. PATENT DOCUMENTS

| | | | |
|---|---|---|---|
| 5,241,625 A | 8/1993 | Epard et al. | |
| 5,703,965 A | 12/1997 | Fu et al. | |
| 7,535,484 B2 * | 5/2009 | Lessing | H04N 7/148 348/14.01 |
| 8,682,973 B2 * | 3/2014 | Kikin-Gil | H04L 65/4015 709/204 |
| 2004/0008249 A1 * | 1/2004 | Nelson | H04N 7/152 348/14.09 |
| 2007/0078948 A1 | 4/2007 | Julia et al. | |
| 2008/0133767 A1 | 6/2008 | Birrer et al. | |
| 2011/0164111 A1 | 7/2011 | Karaoguz et al. | |
| 2012/0162351 A1 * | 6/2012 | Feldman | G09G 5/006 348/14.03 |
| 2014/0040781 A1 * | 2/2014 | Epstein | H04N 5/268 715/753 |

OTHER PUBLICATIONS

International Search Report and Written Opinion for PCT/US16/29079, mailed Sep. 28, 2016, 12 pp.

* cited by examiner

Primary Examiner — Hemant Patel
(74) Attorney, Agent, or Firm — Lathrop & Gage LLP (57) ABSTRACT A method for providing control and visualization of media. A first media stream having an initial resolution is received from a source computer; the first media stream is rescaled to generate a second media stream with a second resolution; the second media source stream is transmitted to a destination computer; after receiving instructions from the destination computer indicating a selection of the second media stream, the stream is rescaled in accordance with the received rescaling information, to generate a third media stream with a third resolution, which is transmitted to the destination computer.

15 Claims, 7 Drawing Sheets

SYSTEM AND METHOD FOR INTERACTIVE AND REAL-TIME VISUALIZATION OF DISTRIBUTED MEDIA

BACKGROUND

Problem to be Solved

Various technologies exist for controlling the appearance and relative position/scale (layout) of multiple media sources on a display. For example, video wall scalars and switchers allow a user to inject control commands into a video routing system that impacts the appearance of the video sources on a single shared display. Video wall control commands necessarily modify the shared appearance of the main display—that is, if a media source is scaled larger on the display—it is scaled for all viewers of that single shared display. At the other end of the spectrum, some systems support individual control that is different from the shared view. For example, some video teleconferencing software systems allow individual users to scale a video stream of a document or web camera view in their own interface, in the absence of a shared view.

As a result, these existing technologies do not address the needs of a distributed visualization system that includes both a host display system that provides a synchronous view of the various media streams and individual (but synchronized) views of that same system on each of the connected source computers. What is needed is a mechanism that allows users to control a shared display surface and to simultaneously view that shared display on connected devices in a way the supports group collaboration and individual viewing of each of the shared media sources, without modifying the main shared display screen.

Consider the case, for example, when four source computers, each connected to a shared display a sharing media sources simultaneously. Assume the shared display is a 1920×1080 resolution screen. If each computer is sharing a single 1920×1080 resolution media stream and all four sources are being shown on the shared display equally, then, at most, any individual source resolution is (1920/2)×(1080/2)=960×540. While this is useful for comparative viewing of different, typically disparate, sources of media, information is necessarily lost. Furthermore, systems that display a replica of the shared display media on each of the individual computers may further reduce the resolution of each displayed media source so that it fits within a constrained user interface.

SUMMARY

Solution

A system and method is disclosed that allows multiple users, at a set of computers to collaboratively visualize a set of media sources using a variety of devices, connected to a common display system. The system supports multiple sources of media that are streamed simultaneously from one or more source computers and arranges those sources on a common display for visualization simultaneously. At the same time, each source computer is presented via a user interface the presents the current arrangement and layout of media streams on the shared display.

The present system and method introduces a technique that allows each participant in a collaboration session to interactively select and view a high-resolution video of a particular source media. This method is needed because previous media streaming systems typically support one-directional streaming of a media source from a source computer to a shared display, but do not support simultaneous visualization of the shared display on a source computer. Even in the case where a graphical representation of the shared display is depicted on the source computers, it is necessarily scaled to match the constraints of the source computer display resolution and, potentially, limitations in the user interface.

DETAILED DESCRIPTION

The present system and method operates in an environment in which a plurality of source computers are connected to a particular collaboration session, with one or more media sources from at least one of the source computers being displayed on a central shared display and also displayed on at least one of the source computers. The system allows a media source to be viewed on a particular source computer in a resolution that is independent of the current scale on the shared display. This functionality provides collaborative visualization of the shared display surface, while supporting individual users viewing single media sources at a desired scale.

Figure 1:
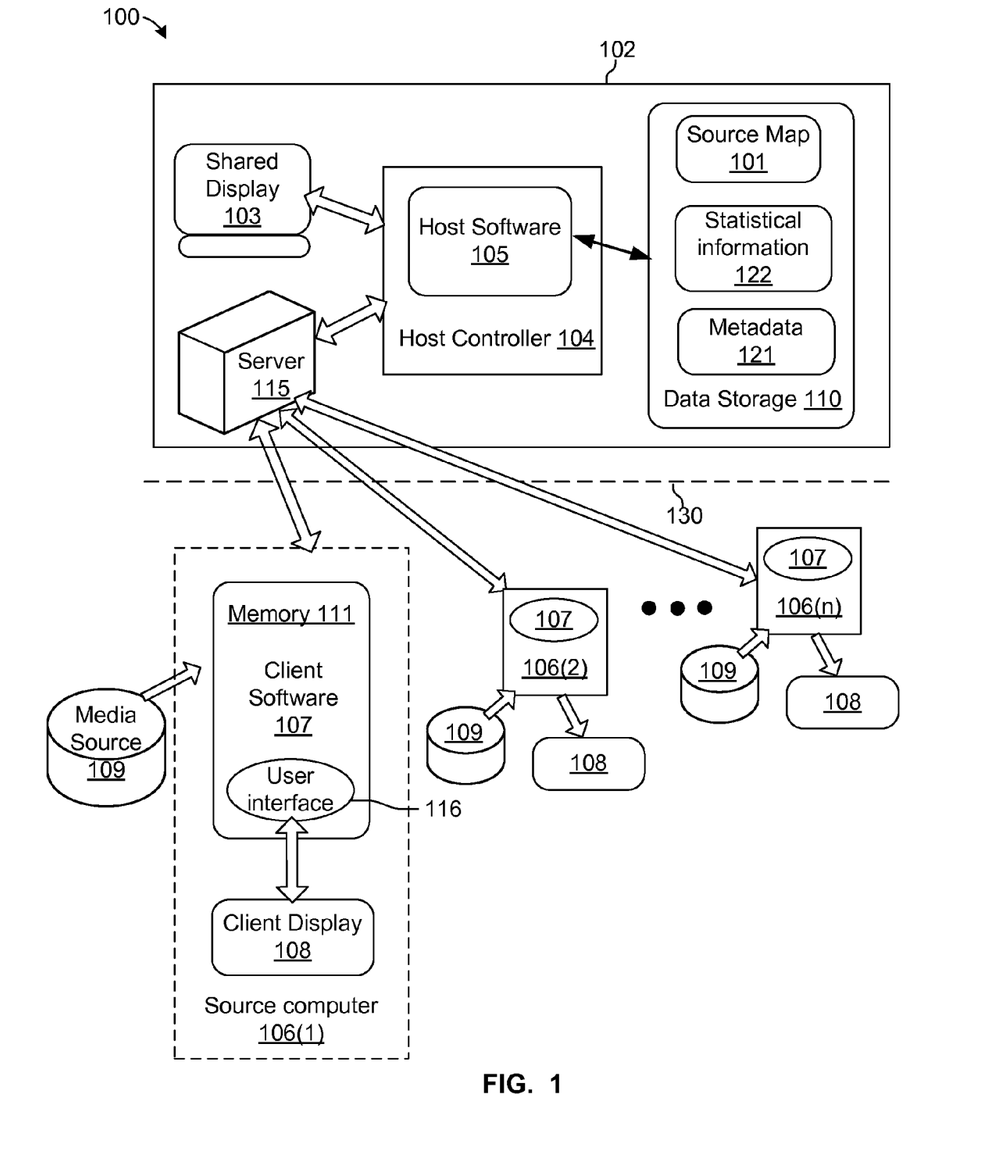
FIG. 1 is a diagram illustrating exemplary components of the present system.

FIG. 1 shows exemplary components of the present system 100, which comprises a host display system 102 and one or more client display devices 106(*) [where the "*" is a wild card indicating an arbitrary device] which communicate with system 102 via a network 130 such as the Internet. As shown in FIG. 1, in an exemplary embodiment, host system 102 includes host controller (digital processor) 104, associated data storage 110, shared display 103, and server 115. Host controller 104, coupled to server 115, executes host software 105 to provide the media scaling functionality described herein. Data storage 110 is used for storing data including a source map 101, and a configuration file 121, used for storing user metadata information. In some cases, users may view the single host computer shared display 103 together for a shared view.

Each source (or 'client') computer 106 may be any type of computer controlled device with a digital processor 104 and a display 108, such as a desktop or laptop computer, tablet, or smart phone, etc. A client software application 107, resident in memory 111 in each source computer 106, performs tasks including providing a user interface 116 for handling and formatting information received from system 102, and sending control information to the system, as described in detail below.

Figure 2:
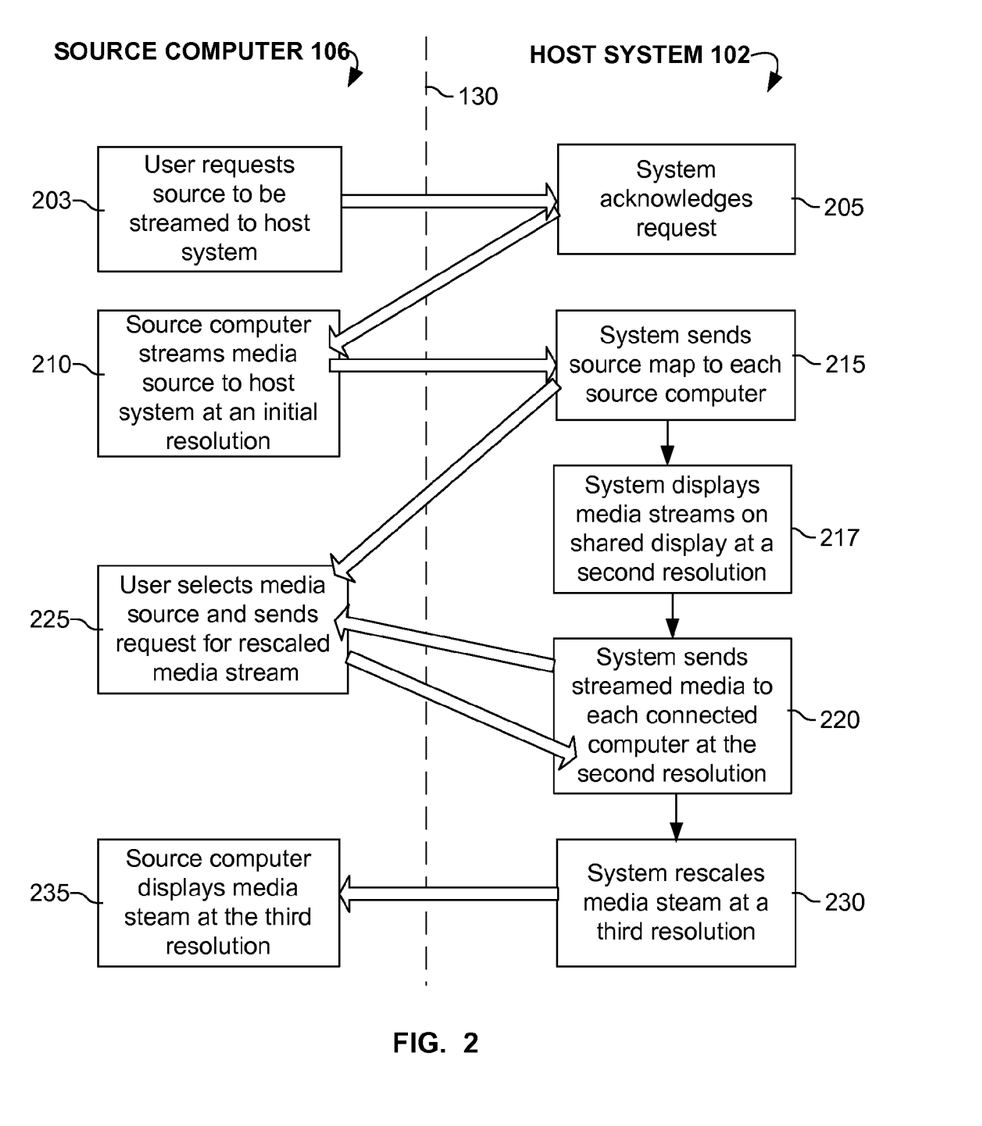
FIG. 2 is a flowchart showing an exemplary set of steps performed in an exemplary embodiment of the present system.

FIG. 2 is a flowchart showing an exemplary set of steps performed in an exemplary embodiment of the present system. As shown in FIG. 2, in response to a request from one or more source computers 106 at step 203, host system 102 establishes a session connection with the requesting computer(s). In this step in an exemplary embodiment, each source computer requests initiation of a new media source stream by sending metadata indicating information including the stream including native resolution, type (still image or video stream), and potentially other data, such as data indicating how the video stream is encoded. System 102 can reject the new stream (if, for example, the maximum number of allowable streams is exceeded); otherwise, the host system acknowledges the request at step 205. In response, at step 210, one or more of the source computers 106 sends host system 102 a respective media source stream having an initial (native) resolution.

At step 215, host system 102 informs each of the connected source computers 106 about media source streams that are presently available from other connected source computers 106 by sending a source map 101 to each connected source computer. The source map 101 may include a graphical representation (i.e., an image of the shared display state), a list of media source names and owners, or other information representing the state of the shared display 103.

In one embodiment, in step 215, host system 102 sends each of the connected source computers a source map 101 in the form of a plurality of 'thumbnails', which are scaled/positioned representations of the available source media streams. The thumbnails are a graphical way to depict the source map, wherein ownership can be shown by the border color of the thumbnail corresponding to an icon, or by displaying a name over the thumbnail, etc. In another embodiment, source map 101 comprises a list of media sources that are not necessarily arranged geometrically or depicted as thumbnails, for example, a list of text names with ownership information, etc. This source map transmission occurs without user input when the user connects to the host system via a source computer and remains connected. In order to view one of the source media streams in higher resolution, the user 'selects' from those indicated as available in source map 101, as explained in detail below.

Source map 101 allows a user to select a particular media source 109 via a user interface 116 on each source computer 106 connected to the host display system 102. For example, in one embodiment, the source map is a graphical representation, on a user interface 116, of each available media source. When, for example, four media sources have been shared to the host display system, each of these sources is shown, in a thumbnail, on the connected source computers at relatively lower resolution and lower frame rate than the respective native resolution of each source media.

At step 217, system 102 displays the media streams from the connected source computer on shared display 103 at a second resolution that allows each of the streams to be viewed on a single display screen, and at step 220, system 102 sends the streamed media from each connected user to each connected source computer, also at the second resolution.

At step 225, in order to select a specific media source to view, in one embodiment, a user at a source computer 106 selects a media source in source map 101 by using interface 116 to right-click on a thumbnail in source map 101 that corresponds to the media source of interest. In this embodiment, a menu appears and the user selects a 'detach and zoom' option. In an exemplary embodiment, source map 101 may include a list of file names, a short description, and the owner of the media source, in which case host system 102 does not necessarily send the actual media streams initially to all connected users. This information is initially sent to each user in lieu of the media stream itself. In such an embodiment, source map 101 comprises data only. As described below, a user can use this data to choose a media source and then begin to receive the selected media source stream. Note that when a media source is viewed in this manner, it may not be the original source video stream. For example, the viewed media may be a set of still images (at native resolution) at a lower frame rate than the original media source stream.

In step 225, after selecting a media source 109(*), a user of source computer 106(*) enters display parameters including rescaling information, via user interface 116, and the source computer sends, to host system 102, control commands including the selected media source and rescaling information.

At step 230, in response to receiving the control commands, host system 102 then transmits a correspondingly re-scaled source media stream, at a third resolution, to the selecting source computer 106(*). The re-scaled media stream is not constrained by the scale and appearance of the media stream (which may be a still image). currently on the shared display, but instead is determined by the selected display parameters for the selected media source. That is, the newly transmitted (rescaled) source media stream can be a different resolution than the corresponding media stream displayed on the shared display 103 and is not impacted by display appearance changes on any of the connected source computers 106. The selecting source computer then displays the received source media stream, at the third resolution.

Figure 3:
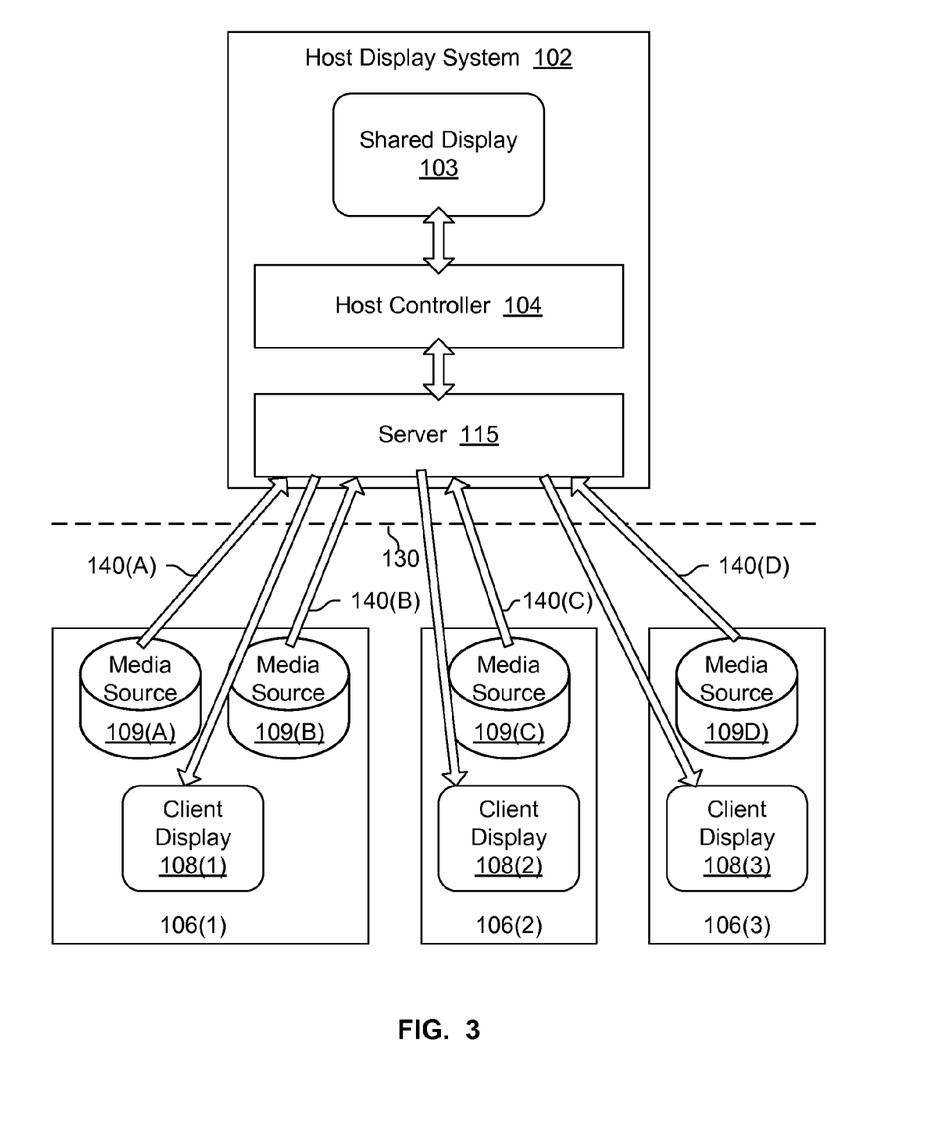
FIGS. 3-5 illustrate an example wherein when four users are connected to the present system and collaborating, with multiple source media files being shared.
Figure 4:
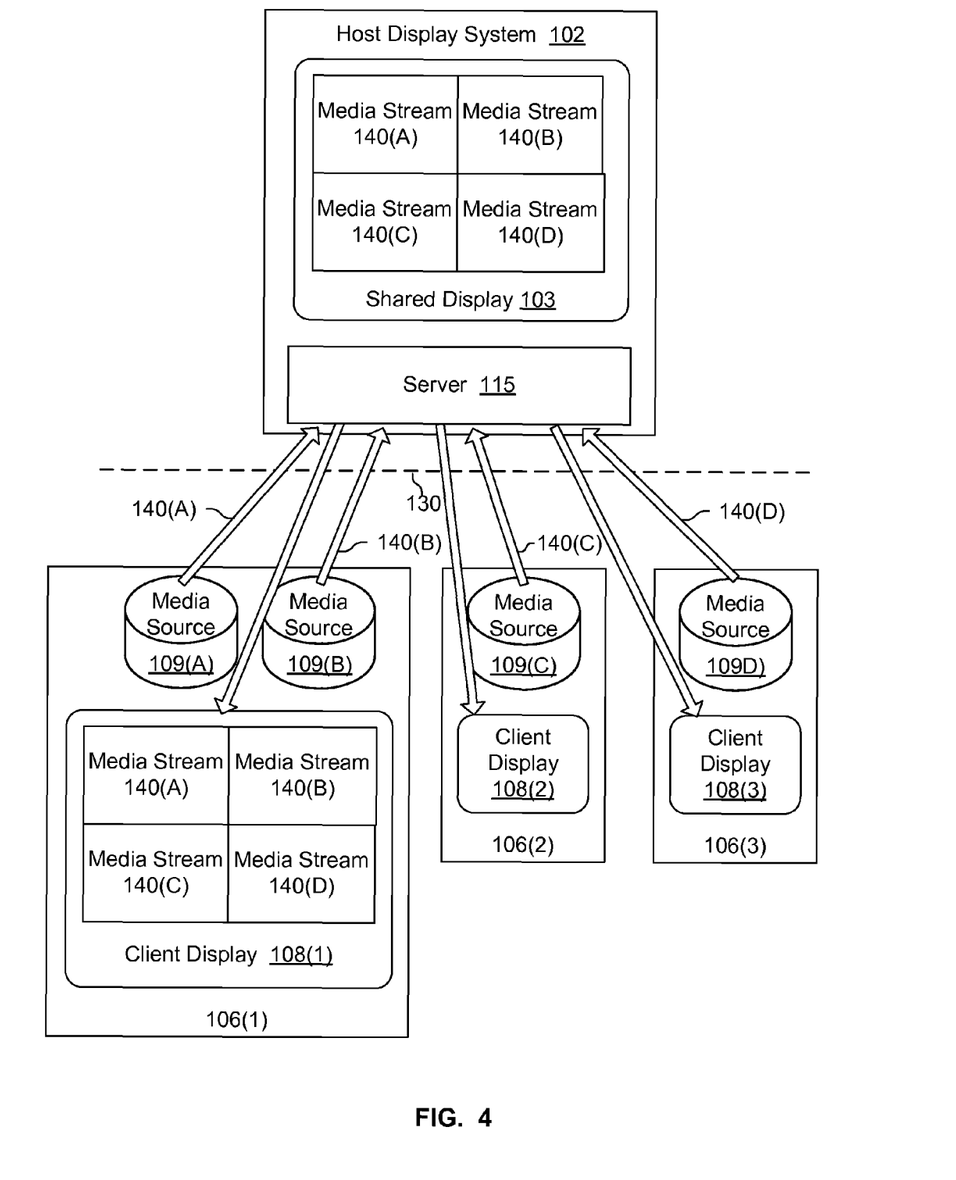
Figure 5:
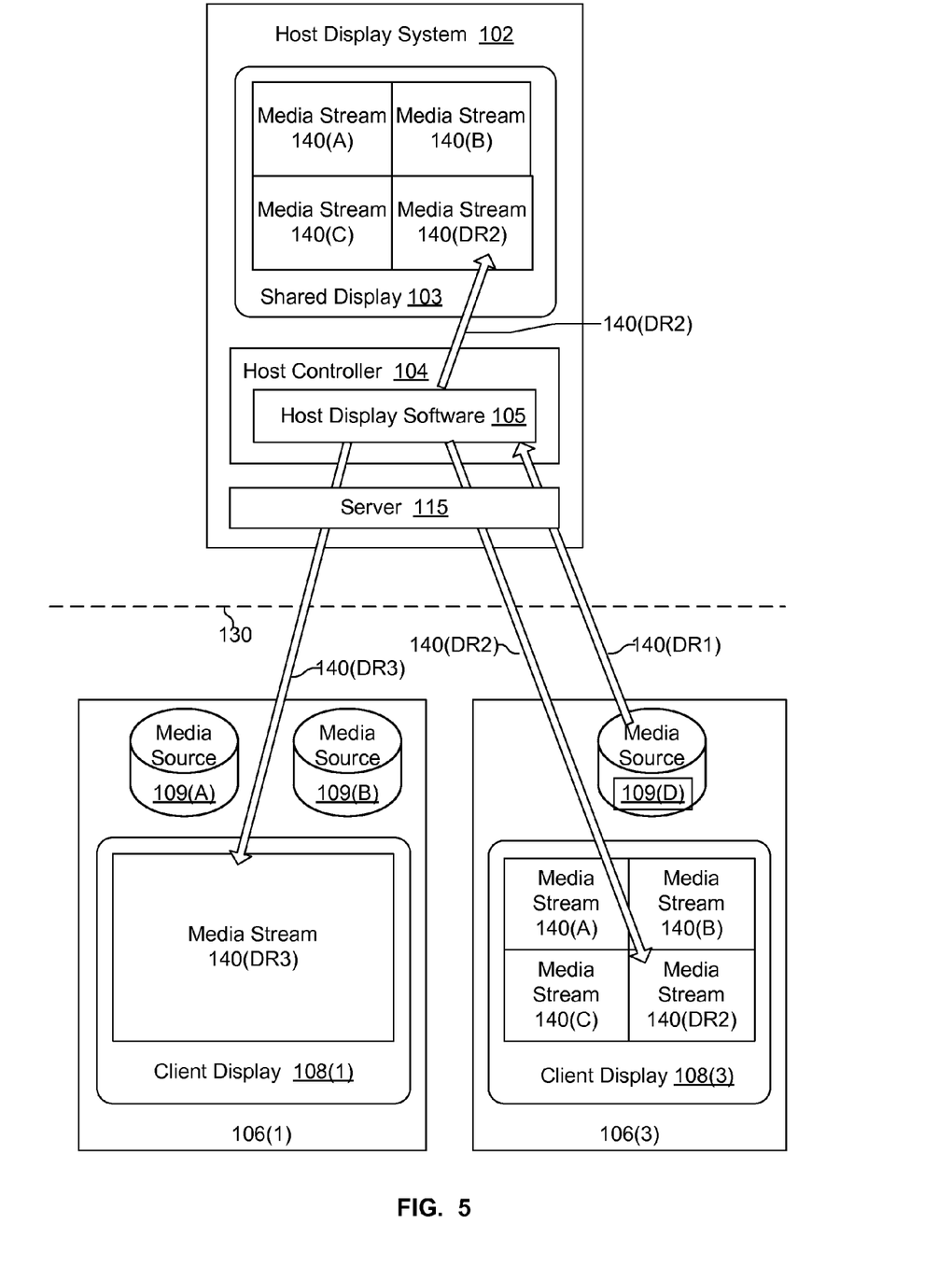

FIGS. 3-5 illustrate an example wherein when four users are connected to the present system and collaborating, with multiple source media files being shared. As shown in the example of FIG. 3, assume three source computers 106(1), 106(2), 106(3), are connected to host display system 102. Source computers connected to the host display system can optionally publish media streams to the shared display. Assume also that source computer 106(1) is streaming two different media streams, stream 140(A), that is 1920×1080 and stream 140(B), that is 1200×720, with resolution 1080p, to the shared display 103. In the present example, a second source computer 106(2) is streaming a 1024×768 media stream 140(C), and source computer 106(3) is streaming a 1920×1080 resolution media stream 140(D).

As indicated in FIG. 2, at step 217, host display system 102 scales and positions the incoming media streams to fit on the shared display surface, potentially rescaling each source to a second resolution.

If all four media sources are being displayed simultaneously, then each source is normally rescaled to fit within a 2×2 arrangement on the shared display surface, as seen in the example of FIG. 4, where the set of media streams that have been shared are simultaneously shown on shared display 103, and also on client display 108 of each connected source computer 106, as shown on client display 108(1) of source computer 106(1) in FIG. 4. At this point, each input media stream has been rescaled in both the X and Y directions. This resolution remapping is dependent on the resolution of the shared display itself.

The resolution mapping can be defined as:

$$S_W = \frac{W}{D_W * A_W}, S_H = \frac{H}{D_H * A_H}$$

where $S_W$ and $S_H$ are the resolution of the shared media stream on the display. The client media stream native resolution is (W,H), the shared display resolution is ($D_W$, $D_H$) and the arrangement scale factor is ($A_W$, $A_H$). The arrangement scale factor takes into account the scale transform that is necessary to remap a source media frame to the shared display due to other sources and their relative sizes. In our example, where four sources are being arranged on the shared display the resolution remapping for source 140(D) is:

$$S_W = \frac{1920}{(1920)*2}, S_H = \frac{1080}{1080*2} \text{ -or- } 960,540$$

This resolution is dynamic and changes based on the current arrangement factor as sources are added/removed or control commands rescale a stream with respect to the other currently published streams on the shared display. It is also dependent on the input resolution of any given media source.

In an exemplary embodiment, source computers that are connected to the shared display, or users who are able to directly observe the shared display, do not initially have access to the media source before it has undergone the initial scaling transformation. This access is accomplished though a request for the media source 140(D) from one of the source computers 106 using a user interface 116 presented by client software 107 on client display 108 to select the requested media source.

For example, if the user controlling source computer 106(1) wants to observe the media stream for source 140(D), at a higher resolution than is currently possible (or extant) on the shared display 103, that user may indicate that requirement via user interface 116 on the user's source computer 106(1).

FIG. 5 depicts the case wherein the host system 102 receives the request and begins sending rescaled media stream 140(DR3), along with other media sources, to source computer 106(2). FIG. 5 illustrates the simultaneous transmission of 3 different levels of resolution for initial media stream D in the FIG. 5 example—initial source resolution [stream 140(DR1)], shared display (default) resolution [stream 140(DR2)], and rescaled resolution [stream 140(DR3)].

Figure 6:
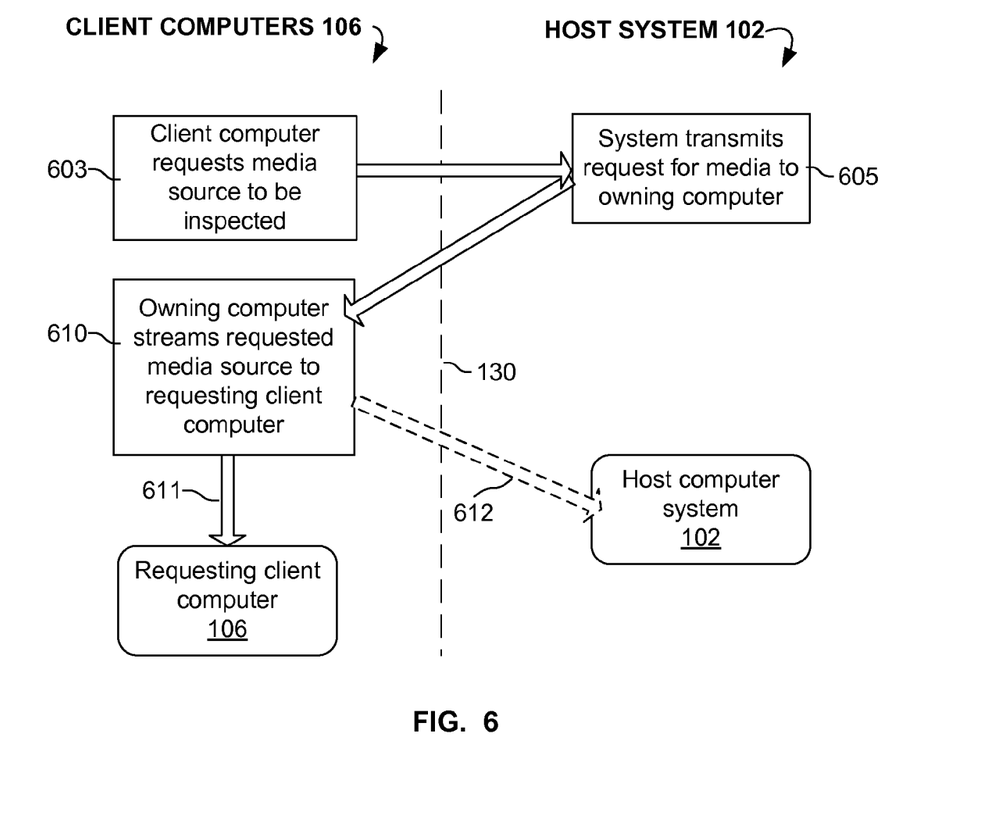
FIG. 6 shows an exemplary embodiment wherein a media source is transmitted directly from a source computer to a destination computer.

FIG. 6 shows an exemplary embodiment wherein the media source is transmitted directly from a source computer 106 to a destination computer 106 rather than from the host computer system 102 itself. This is the case where a user of a client computer 106 wants to 'inspect' a media source 109 that is streaming from another client computer. Here, the host computer system 102 acts as a mediator, and the media is not streamed from the host system, but instead, the host system requests the client computer (which is the source of the 'to-be-inspected' media stream) to send the stream to the client computer that made the request.

As shown in FIG. 6, at step 603, a client computer 106 requests a specific media source 109 to be inspected. At step 605, the host system 102 receives the request to inspect the media source, and transmits a corresponding request to the client computer that initially transmitted the requested media stream (the owner of that stream, or 'owning client computer') to send the stream to the requesting client computer. In response to the request, at step 610, the owning client computer begins transmitting the media source to the requesting client computer, as indicated by arrow 611. Alternatively, at step 610, the owning client computer transmits the requested media source to both to the host computer system and the requesting client computer, as indicated by arrows 611 and 612.

Figure 7:
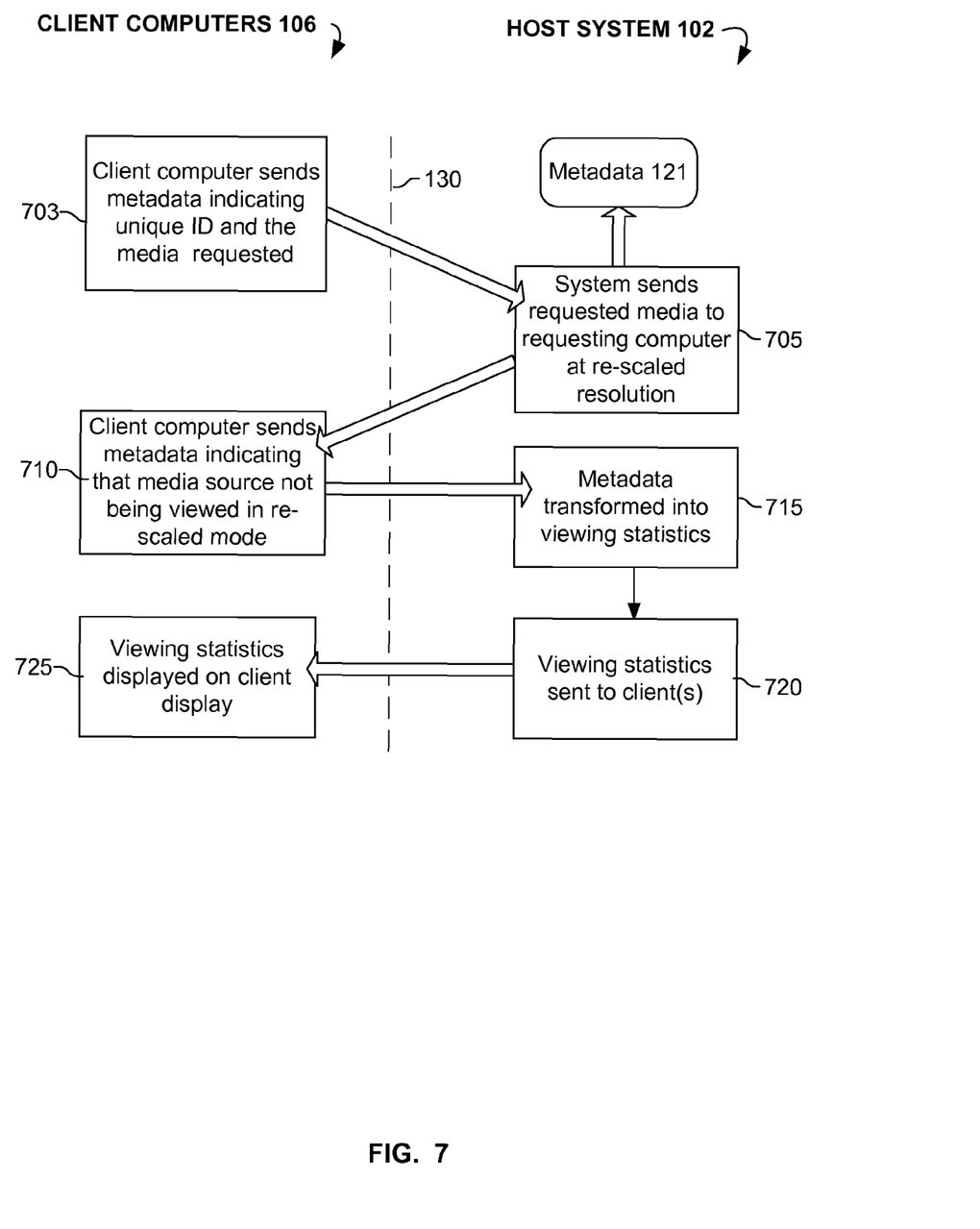
FIG. 7 shows an exemplary embodiment wherein metadata is transmitted between client computers to indicate if a particular source is being inspected.

FIG. 7 shows an exemplary embodiment wherein metadata is transmitted between client computers to indicate if a particular source is being inspected, and for how long. In this embodiment, a user may view information indicating the number of people who are inspecting a particular media element, and other statistics that may be pertinent.

As an example, consider a professor that has shared both a slide presentation and a spreadsheet from their laptop (source client computer). Students in the room can connect to the host computer and, via their own user interface, see both media sources, scaled appropriately in their own source map. Initially, those images in the source map are low resolution and scaled to fit on the students' devices—possibly not allowing them to, for example, read text in a particular slide.

Students may, from time select a media source from the source map and see it in high-resolution, scaled to fill their entire display, or allowing them to pan/zoom around at the native resolution of that particular source.

Assume, in the present example, that the professor has shown several slides and then pauses to move on to a discussion of the information in the spreadsheet. Students may still be viewing the slide source using the method described herein. What is needed is a mechanism that allows seeing whether some people in the class have 'fallen behind' the discussion because they are still studying the slide source on their own devices and are presently not looking at the spreadsheet. The present system solves his problem by providing an "engagement" metric that can be indicated on the professor's client computer user interface.

As shown in FIG. 7, at step 703, a client computer 106 requests a particular source for "tear-out", the host system 102 stores, in data storage 110, metadata 121 indicating the client computer's request including the user's name and unique ID, the time of the request, and which media source stream 140(n) was requested. This metadata information is referred to as a viewing event. "Tear-out" is the process of selecting and thus 'tearing out' a particular media source from the source map 101 for more detailed viewing.

At step 705, in response to the client computer's request, host system 102 transmits, to the requesting client computer 106, the appropriately re-scaled (possibly at native resolution) media source stream 140(n) based on the request, as described above with respect to FIGS. 1-5.

AT step 710, when a user is no longer viewing a transmitted media source (via a client computer user interface 116) at a re-scaled resolution, metadata 121 indicating this condition is transmitted from the client computer to the host system 102, indicating that the re-scaled high-resolution viewing is no longer taking place on the user's client computer. This condition is also a viewing event, which is related to the viewing event that took place earlier when the same client computer began displaying the re-scaled media source.

At step 715, the received metadata information is transformed into viewing statistics by host computer 102, by combining the various viewing events into accumulated statistical information 122, which is stored in data storage 110. By way of example, viewing statistics may include:

the number of users currently viewing a 'torn-out' media source;

the names of all the users currently viewing a torn-out media source;

the percentage of the class that are viewing any source in a torn-out mode versus simply viewing the full media map graphic;

the total time that a user has been viewing a source in torn-out mode and the number of users that have been viewing a source longer than a particular amount of time.

Finally, at step 720, viewing statistics are made available to client computers or to the shared display, or to both, by transmitting the viewing statistics to one or more client computers and using the corresponding user interface(s) 116, at step 725, to display those statistics in some manner.

For example, if a student who is confused and 'stuck' on the slide media source for more than 5 minutes, the moderator's user interface may depict this event by drawing an indicator, on an icon corresponding to the student, that indicates "confused".

In one embodiment, host system 102 monitors the start/stop times of a "viewing event" for each of the connected computers. During system operation, the host system collects data for each connected user including user name, a unique ID for that user, start viewing time, end viewing time, and a media ID. The accumulated event data is then transformed into information indicating how many/which viewers are currently viewing media. This information is then used to indicate the percentage of users who are no longer looking at the shared screen because they are viewing one of the selected media streams privately.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A method for providing control and visualization of media comprising:
   receiving, from a first media source computer, a first media source stream having an initial resolution;
   rescaling the first media source stream to generate a rescaled first media source stream having a second resolution, the second resolution based on a number of media source streams simultaneously displayed on a shared display at the same time and a resolution of the shared display;
   displaying the rescaled first media source stream on a host computer having the shared display;
   transmitting, to a destination computer, a source map indicating the position of each media source stream on the shared display;
   receiving instructions from the destination computer indicating a selection of the rescaled first media source stream and rescaling information for the destination computer;
   rescaling the first media source stream in accordance with the received rescaling information, to generate a second rescaled first media source stream with a third resolution based on the rescaling information; and
   transmitting the second rescaled first media source stream to the destination computer.

2. The method of claim 1, further comprising displaying the second rescaled first media source stream on the destination computer.

3. The method of claim 1,
   the source map including a plurality of thumbnails each representing the media source streams as positioned on the shared display;
   the method further comprising displaying the thumbnails on the destination computer, in accordance with the source map.

4. The method of claim 3, wherein the source map comprises a graphical representation depicting the size and position of the rescaled first media source stream and other rescaled media source streams displayed on the shared display of the host computer.

5. The method of claim 1, further comprising: displaying the rescaled first media source stream on the destination computer.

6. The method of claim 5, further comprising:
   receiving, from at least one of the first media source computer and a second media source computer, at least a second media source stream having an initial resolution;
   rescaling the at least second media source stream to generate at least a rescaled second media source stream having a second resolution, the second resolution based on a number of media source streams simultaneously displayed on the shared display and the resolution of the shared display;
   displaying at least the rescaled second media source stream in conjunction with the rescaled first media source stream on the shared display of the host computer;
   updating the source map with a new position of each media source stream and retransmitting the updated source map to the destination computer.

7. A method for indicating if a particular media source is being inspected by at least one of a plurality of interconnected computers including a source computer and a destination computer comprising:
   receiving, from the source computer, a media source stream;
   receiving instructions from the destination computer indicating a selection of the media source stream;
   capturing a first viewing event including a user name, a time of selection of the media source stream, and an indicia of the media source selected and storing the first viewing event as a first metadata;
   transmitting the media source stream to the destination computer,
   capturing a second viewing event when the transmitted media source steam is no longer being displayed at the destination computer and storing the second viewing event as a second metadata;
   transforming the first and second metadata from the first and second viewing events into viewing statistics by analyzing the viewing event information; and
   sending the viewing statistics to one of the interconnected computers.

8. The method of claim 7, further comprising:
   collecting data from each of the interconnected computers including start viewing time, end viewing time, and media ID, for each said media source stream selected by the interconnected computer;
   transforming the collected event data into viewing event information indicating which users are currently viewing the first media source stream; and
   using the viewing event information to indicate the percentage of users who are viewing any of the selected media streams.

9. The method of claim 7, wherein the viewing statistics are sent to at least one of the interconnected computers and to a shared display.

10. The method of claim 7, wherein said viewing statistics include: the number of users currently viewing a selected media source stream.

11. The method of claim 7, wherein said viewing statistics include: the user names of all the users currently viewing a selected media source stream.

12. The method of claim 7, wherein said viewing statistics include: the percentage of the interconnected computers viewing selected media source streams.

13. The method of claim 7, wherein said viewing statistics include: a difference between an end time and a start time that a user has been viewing a selected media source.

14. The method of claim 7, wherein said viewing statistics include: a number of users that have been viewing a selected media source stream longer than a predetermined amount of time.

15. The method of claim 7, wherein the first and second metadata data stored from each of the interconnected computers includes user name, a unique ID for the corresponding user.

\* \* \* \* \*